M. A. VIOLET.
ELASTIC FORK FOR MOTOR CYCLES AND OTHER VEHICLES HAVING A SINGLE STEERING WHEEL.
APPLICATION FILED MAR. 29, 1921.
1,424,695.
Patented Aug. 1, 1922.
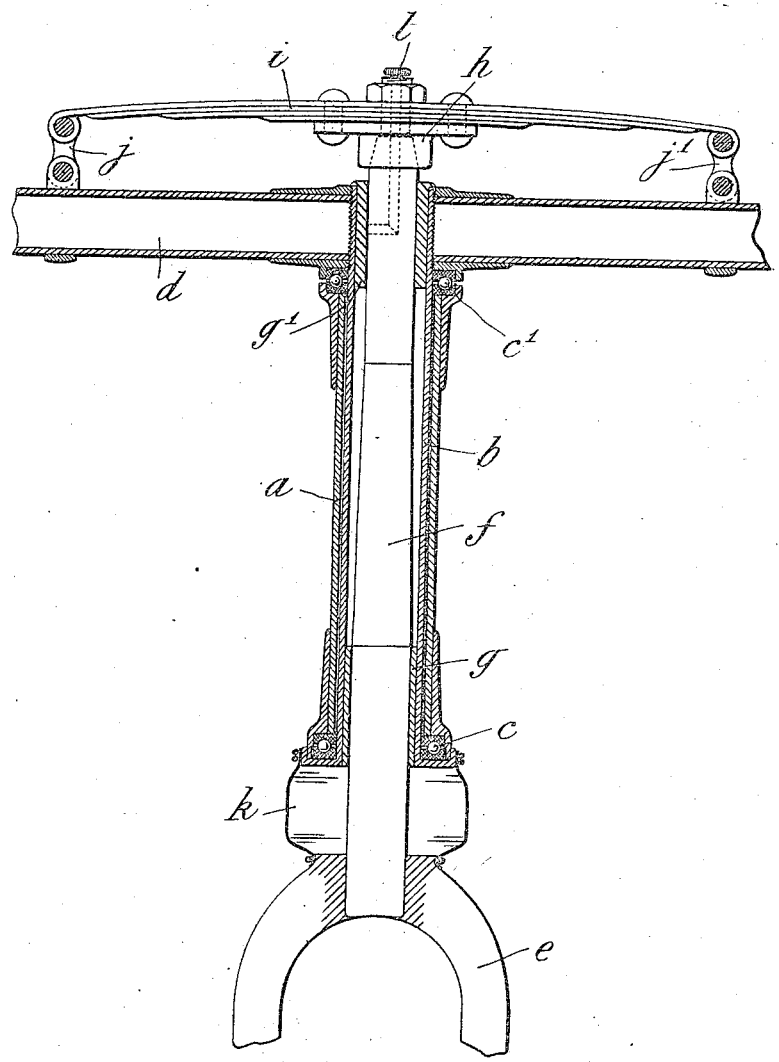

UNITED STATES PATENT OFFICE.

MARCEL ACHILLE VIOLET, OF LEVALLOIS-PERRET, FRANCE.

ELASTIC FORK FOR MOTOR CYCLES AND OTHER VEHICLES HAVING A SINGLE STEERING WHEEL.

1,424,695.  Specification of Letters Patent.  Patented Aug. 1, 1922.

Application filed March 29, 1921. Serial No. 456,660.

(GRANTED UNDER THE PROVISIONS OF THE ACT OF MARCH 3, 1921, 41 STAT. L., 1313.)

*To all whom it may concern:*

Be it known that I, MARCEL ACHILLE VIOLET, citizen of the Republic of France, and resident of 67 Rue Rivay, Levallois-Perret, Seine, in the said Republic, engineer, have invented certain new and useful Improvements in Elastic Forks for Motor Cycles and Other Vehicles Having a Single Steering Wheel (for which applications for patents have been filed in France, June 1, 1918, No. 101,460; Great Britain, May 5, 1919, No. 11,149; and Germany August 21, 1919, No. 14,904); and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an arrangement by the aid of which the pivoting part of the frame of a motorcycle or other vehicle having a single steering wheel is elastically connected to said steering wheel in such a manner that the vertical movements of the latter are not transmitted to the frame, while a perfect connection is maintained between the two parts in their angular displacements.

This arrangement is illustrated in vertical section in the accompanying drawing.

$a$ indicates the forward tube of the frame, in which the ordinary steering tube $b$ can turn, owing to roller bearings $c$ and $c^1$. The handle bar $d$ is rigidly connected to the tube $b$. The whole of these parts exist in ordinary steering mechanism, but the tube $b$ directly carries the head of the fork.

In the present arrangement, the head of the fork $e$ is mounted on a rod $f$ sliding through sleeves $g$ and $g^1$ arranged in the interior of the steering tube $b$.

At the upper part of the rod $f$, a part $h$ carrying a leaf spring $i$ is mounted on a cone, and the extremities of the spring are connected to the handle bar by the intermediary of oscillating links $j$ and $j$.

A sheath $k$ of pliable leather protects the lower portion of the exposed parts from mud and dust.

A lubricating passage closed by a screw $l$ provides for the lubrication of the apparatus.

Having now described my invention, what I claim is:

1. In an arrangement of elastic fork for motorcycles and other vehicles having a single steering wheel, a forward tube, a steering tube therein, a handle bar rigidly secured to said steering tube, a stem within the steering tube secured to the fork head and capable of moving lengthwise, sleeves to guide the stem; a leaf spring secured at its middle to said stem of the fork head and parallel to the handle bar, and links connecting the ends of the spring to the arms of the latter.

2. In a motor cycle or like vehicle, the combination with a tubular frame member, of a wheel fork, a stem on the latter slidably mounted in and protruding through the tubular member, a transverse member fixed to the latter, and a leaf spring connecting the protruding end of the stem to the transverse member.

3. In a motor cycle or like vehicle, a tubular frame member, a steering tube rotatably mounted in the tubular member, a handle bar on the steering tube, a wheel fork having a stem projecting through the steering tube and movable longitudinally therein, and a leaf spring secured to the stem and to the handle bar.

4. In a motor cycle or like vehicle, a forward tubular frame member, a steering tube rotatable in the latter, a handle bar fixed to the steering tube, a wheel fork having a stem projecting through the steering tube and movable longitudinally therein, guide sleeves surrounding the stem, a leaf spring centrally fixed to the stem, and links connecting the free ends of the spring to the handle bar.

In testimony that I claim the foregoing as my invention, I have signed my name.

MARCEL ACHILLE VIOLET.